Feb. 6, 1973   R. SAUER ET AL   3,714,962
PIPELINE SYSTEMS
Filed July 15, 1971   5 Sheets-Sheet 1
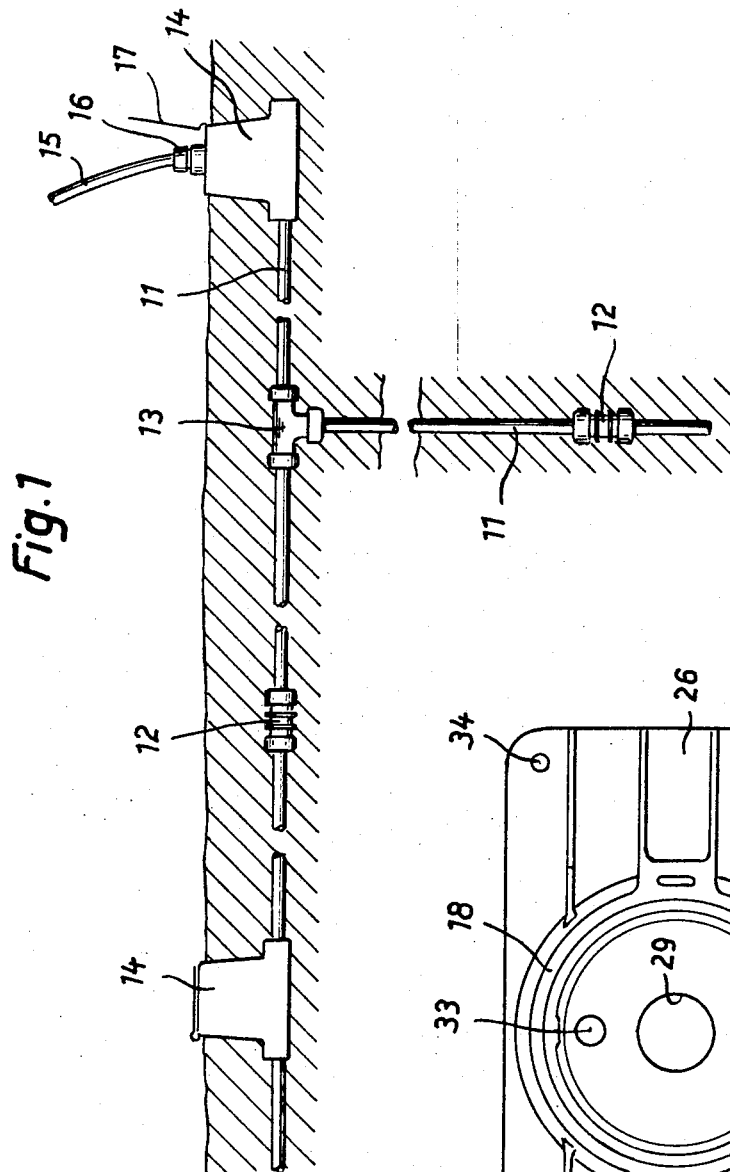
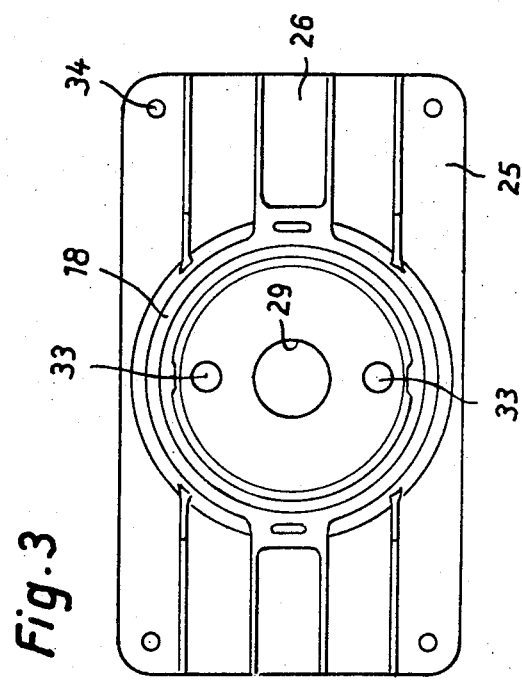
INVENTORS.
ROLAND SAUER,
JOHANNES KATZER &
BY CHRISTIAN STEPHANY
Brumbaugh, Graves, Donohue & Raymond
their ATTORNEYS.

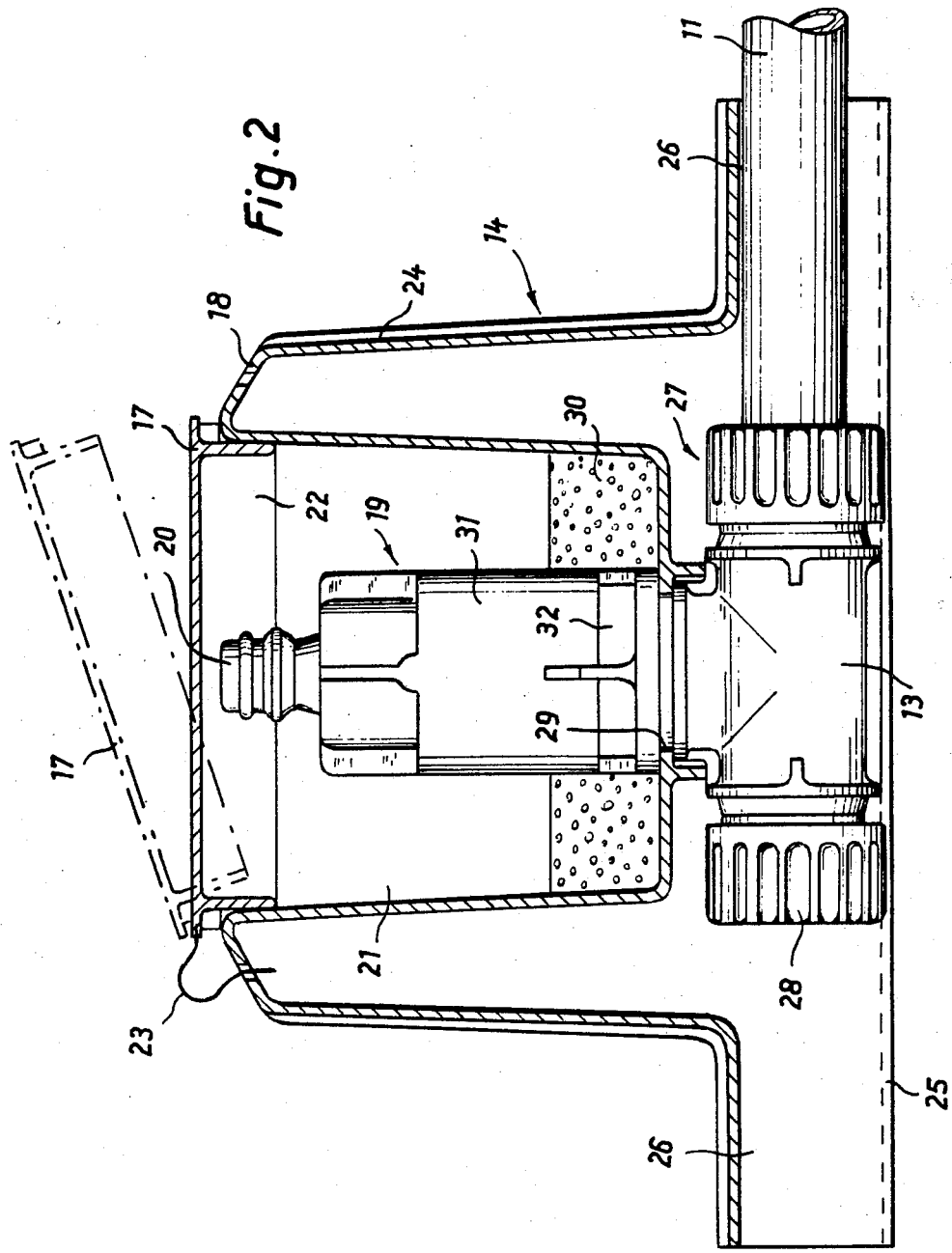

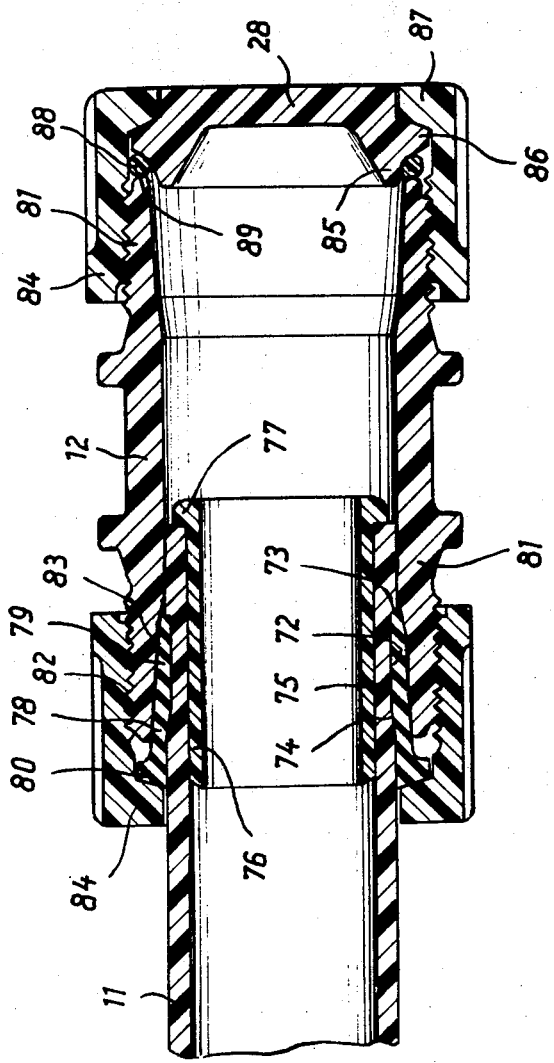

United States Patent Office 3,714,962
Patented Feb. 6, 1973

3,714,962
PIPELINE SYSTEMS
Roland Sauer, Einsingen, Johannes Katzer, Neu-Ulm, and Christian Stephany, Erbach, Germany, assignors to Kupex AG
Filed July 15, 1971, Ser. No. 162,807
Claims priority, application Germany, July 21, 1970, P 20 36 215.6
Int. Cl. B05b 1/14
U.S. Cl. 137—371
27 Claims

ABSTRACT OF THE DISCLOSURE

The invention provides a pipeline system, advantageously an underground pipeline system, having a number of coupling elements at various localities all connected to a mains liquid supply and each adapted to receive a quick fastening plug-in connector. Each coupling element includes a shut-off valve which is automatically opened when the plug-in connector is fitted. The pipeline system includes a plurality of lengths of plastics piping, a peripheral groove being provided in each end of each pipe length. A resilient ring is fitted in each groove and is received within an end portion of a hollow connecting body and clamped by means of a clamping nut screwed onto the connecting body end portion. The connecting body forms part of connecting means for connecting the pipe lengths to one another and to the coupling elements.

---

Figure 4:
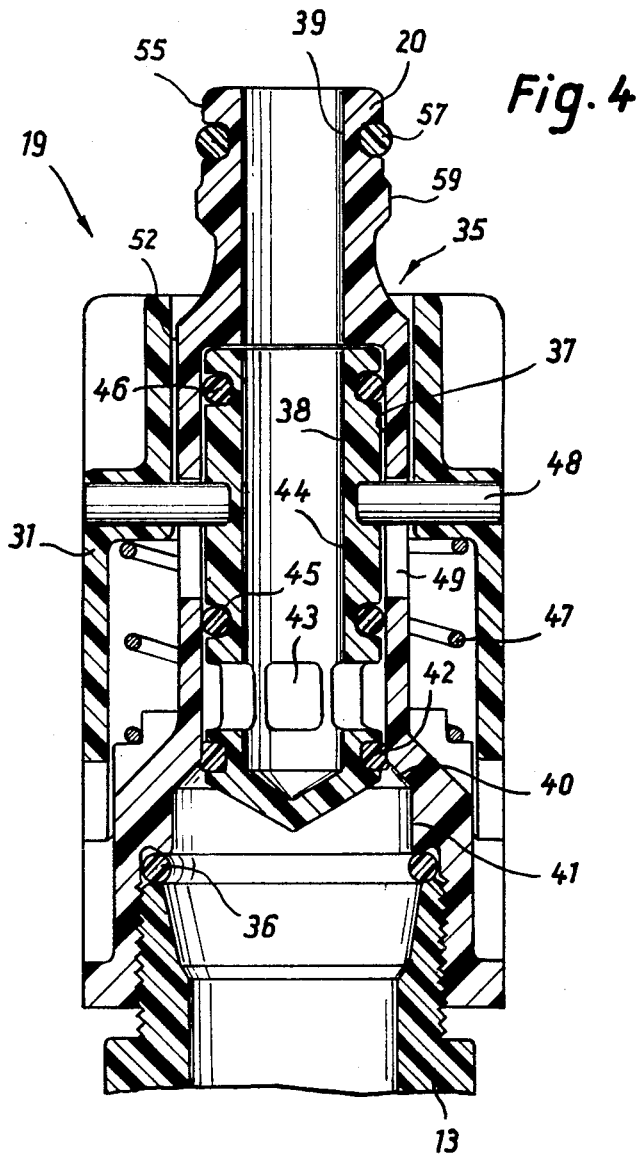

The invention relates to a pipeline system, particularly for fixed water supply in gardens or the like, comprising pipes which are interconnectible by way of connecting or distributing members and which have shut-off and coupling elements coupled thereto.

Such pipeline systems normally comprise metal pipes which are laid fairly deeply in the ground and which are interconnected by way of screw pipe couplings. They are normally laid by plumbers who have the necessary specialised knowledge and tools for cutting the pipes to the correct lengths, interconnecting them, and coupling the branch members to which are coupled the coupling elements which project from the ground and which are provided with taps and valves. These conventional pipeline systems have considerable disadvantages. As already mentioned, they can be laid satisfactorily only by skilled labour, they are expensive to assemble, susceptible to corrosion and frost, and have shut-off and coupling elements which extend out of the ground in a troublesome manner.

A feature of the invention is to provide a pipeline system of the initially mentioned kind which may be laid by unskilled labour, comprises few expensive components, and is unobtrusive.

In accordance with the invention, the pipes are lengths of plastics material piping provided at both ends with recesses into which engage connection elements which are acted upon by a clamping nut which is associated with the connection members, distributing members and coupling elements and which simultaneously effects non-displaceable connection and sealing; the coupling elements are constructed for the coupling of a quick-fastening plug-in connector, have a valve which opens automatically when the quick-fastening plug-in connector is slipped on, and a coupling nipple which stands at right angles to the pipeline system and which is located at a short distance from the pipeline system; and the pipeline system is connectible to a mains liquid supply.

The invention enables a garden-owner to obtain the said coupling, connecting and distributing members and standardised lengths of plastics material piping already provided with the recesses and connection elements, and to lay a pipeline himself in a safe and reliable manner with only a few manual operations.

Virtually all parts of a pipeline system, comprising a combination in accordance with the invention, can be made from plastics material, so that they are flexible, pressure-resistant and pressure-tight, resistant to corrosion, and not endangered by frost.

The pipeline system constructed in accordance with the invention is designed particularly for laying in the ground. Owing to the flexibility and frost-resistance of the pipeline system, it is possible to lay the pipes relatively near the surface of the ground.

Advantageously, the coupling elements may be surrounded by a housing having a well-like chamber which is substantially closed at the sides and at the bottom and whose top is closable by a hinged cover and the housing is constructed for burying in the ground with the axis of coupling substantially vertical and with the region of the cover substantially flush with the ground. Thus, for example, a plurality of coupling elements may be arranged substantially flush with the ground in an area of lawn, only the covers of the coupling elements being visible. When connecting a hose, for a lawn sprinkler for example, it is necessary only to open the cover and push on the quick-fastening plug-in connector of the hose. The valve is thus simultaneously opened and the lawn sprinkler commences to operate. It is also possible to push the lawn sprinkler itself directly onto the coupling element, or to interpose an intermediate member if required. These coupling elements are unobtrusive, occupy little space, and are inexpensive, so that a considerably larger number may be provided than was customary hitherto in the case of unsightly taps projecting from the ground.

In this connection, it is particularly important that the pipes and elements of the system be interconnected in a strong, fluid-tight manner. This is necessary in order to absorb the thermal expansions and contractions which can exert considerable forces on the system. In accordance with a preferred feature of the invention, a connection between a pipe and a connection member overlapping the pipe is provided by a clamping nut which is screwable onto the connection member and a ring which is clampable between the clamping nut, pipe and connection member, the pipe having at a distance from its end a continuous recess having a flat chamfered portion directed away from the end and a steep shoulder adjoining the end of the pipe. The ring is made from resilient material and has a conical configuration tapering inwardly and outwardly towards the end of the pipe, the inner surface of the ring being substantially adapted to the recess and, after the ring has been dilated and slipped onto the pipe, the ring engages into the recess and its ends abut against the shoulder. The outer surface of the ring is overlapped in substantially the entire region of the recess by an inner chamfered portion on the connection member, and in this region the ring is pressed into the recess by the inwardly directed radial force exerted upon the ring by the wedging or clamping action. The ring has a flange for axial abutment against the clamping nut at one end.

Figure 5:
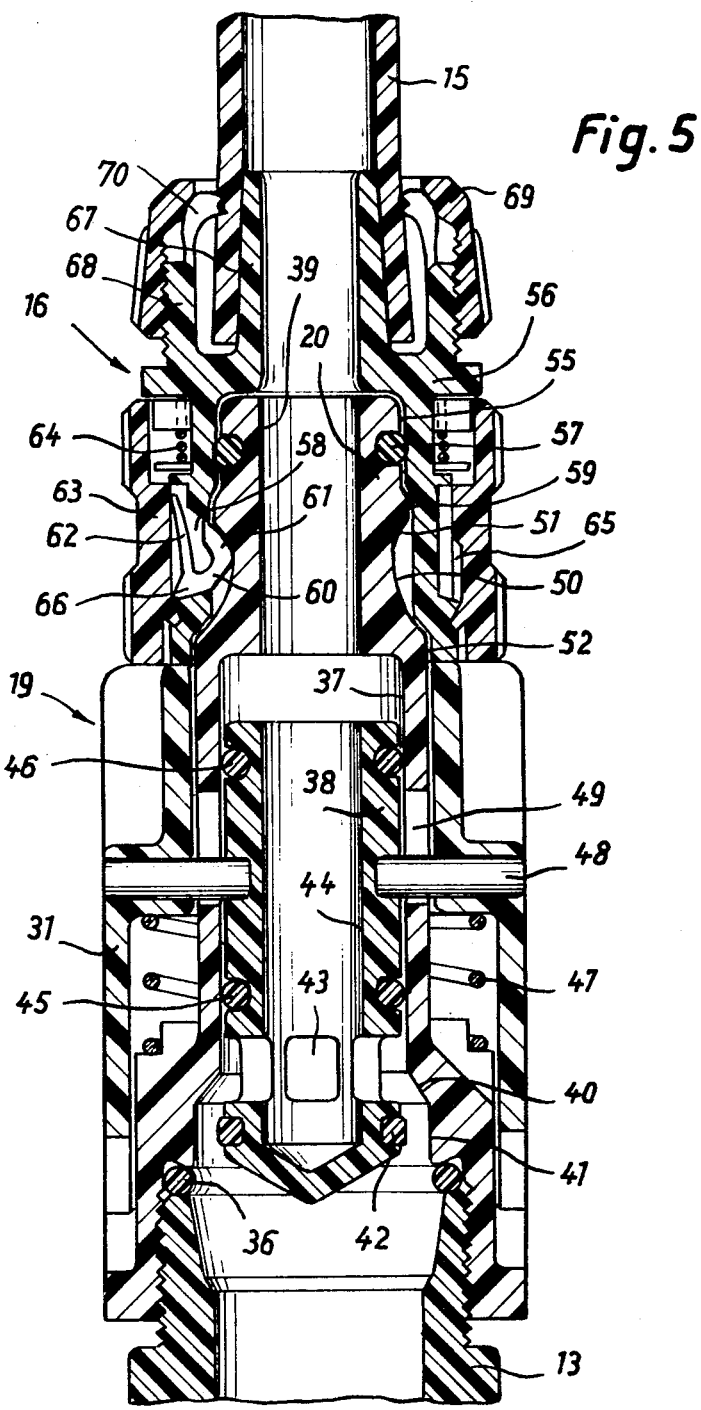

The invention is further described, by way of example, with reference to the accompanying drawings, in which:

FIG. 1 is a diagrammatic illustration of a pipeline system laid in the ground (although only the vertical extent of the pipe system is illustrated in the drawing, the system actually also extends horizontally), FIG. 2 is a fragmentary section through a coupling element, FIG. 3 is a plan view of the housing of the coupling element, illustrated with its cover omitted, FIG. 4 is a fragmentary section through the coupling element, illustrated in its closed state and without a connector coupled thereto, FIG. 5 is a section corresponding to FIG. 4, but showing the open state of the coupling element with the connector pushed onto the coupling element, and FIG. 6 is a section through a pipe connection.

The pipeline system illustrated in FIG. 1 is primarily intended to be laid in the ground, in order to provide a plurality of water outlet couplings or outlets in a garden for example. The entire system is made from plastics materials and may readily be assembled without tools.

Some of the chief parts of the system are illustrated in FIG. 1, i.e., plastics pipes 11 which are normally provided in standard lengths, connection members 12 by which the pipes may be interconnected, distributing members 13 and coupling elements 14. The coupling elements 14 are connected to the pipes 11 which supply the coupling elements with water which, in FIG. 1 for example, comes from below from a mains supply. A hose 15 having a quick-fastening plug-in connector 16 is coupled to the right hand coupling element 14 shown in FIG. 1. The coupling element 14 has a cover 17 which is opened to enable the hose connector to be coupled to the coupling element 14.

The entire system may readily be laid in the ground. A trench is dug for this purpose, the corresponding standard lengths of the pipe are interconnected by means of connection and distributing members, and the coupling elements 14 are connected at or between the desired points. The connecting elements are also sunk in the ground, preferably to a depth where only their upper portion with the cover 17 projects upwardly to the ground surface. A plate could be laid around the coupling element if there were the risk of loose earth soiling the interior of the coupling element.

It is to be mentioned that the pipeline system is also suitable for laying above the ground, for example for installing a coupling point on a garage wall or any other wall. In this case, the coupling elements 14 may be attached to the wall by screws and, where necessary, the pipes or their connection members may be secured by means of clips. Due to the fact that all the parts of the pipeline system are made from plastics material, the system is particularly suitable for installing out of doors and at a relatively short distance below the surface of the ground. Owing to their great resilience, the plastics pipes are frost-resistant and there is no risk of corrosion. Due to the flexibiltiy of the pipes, it is possible to adapt them to the prevailing conditions when they are being laid. Thus, slight curvatures may readily be produced by bending the pipe as it is laid.

The portions of the pipeline system illustrated diagrammatically in FIG. 3 are more clearly described hereinafter. FIG. 2 shows a coupling element 14 whose housing 18 contains an inner portion 19. The inner portion 19 will be further described in detail hereinafter with reference to FIGS. 4 and 5. The inner portion 19 is substantially vertical and its top end is provided with a connector nipple 20 for the quick fastening plug-in connector 16 which may be of known kind. The housing has a well 21 having an upper opening 22 which may be closed by means of the cover 17. The cover 17 is connected to the housing by means of an integral plastics material strip 23 and may be resiliently opened by pivoting.

The housing 18 is of double-wall construction, the outer wall 24 of the housing being connected to the walls of the well 21 in the region of the opening 22. The outer walls 24 extend downwardly further than the bottom of the well 21 and, as may be seen particularly from FIG. 3, form an anchor plate 25 in which tunnel-like recesses 26 for the pipeline system are provided at two oppositely located places. The pipe 11 extends through the recesses 26 into the coupling element where it is connected to a distributing member 13 by means of a pipe connection 27 which is further described hereinafter. In the illustrated embodiment, the opening of the distributing member 13 located opposite the pipe 11 is tightly closed by a closure member 28 which will also be described hereinafter. However, it may be mentioned that a pipe 11 may also be connected to this end, so that a plurality of coupling elements 14 may be mounted on a pipe system one after the other.

The inner portion 19 of the coupling element 14 is screwed onto the end of the distributing member 13 projecting at right angles to the axis of the pipe, the said inner portion extending through an opening 29 in the bottom of the well 21. The portion of the housing located around the opening 29 is clamped between the inner portion 19 and the distributing member to secure the inner portion 19 and the distributing member 13 to the housing. A filling piece 30 made from soft resilient foam material, such as a plastics foam, is located in the well 21 and covers the bottom region of the well 21. Preferably, the filling piece is removable and thus enables the well 21 to be cleaned rapidly if earth etc. should drop into the well. Furthermore, the filling piece covers a gap 32 between the lower end of an axially displaceable actuating element 31 and the lower end of the inner portion 19, so as to prevent the ingress of dirt into this region and the obstruction of axial displacement of the actutaing element.

FIG. 3 shows a plan view of the housing 18 (without the inner portion 19, the cover 17 and the pipe 11). It may be seen that, for reasons of stability, the housing is well ribbed to prevent turning in the ground and to ensure good anchoring. Water which may enter the well 21 can drain off through outlet holes 33 provided in the bottom of the well 21 and may seep into the ground. For this purpose, the filling piece 30 (not illustrated in FIG. 3) is made preferably from an open-cell foam material. Furthermore, it may be seen from FIG. 3 that openings 34 are provided in the corners of the anchor plate or base plate 25 and serve to enable the coupling element to be mounted on a wall etc.

FIG. 4 shows a section through the inner portion 19 of the coupling element 14, drawn to a larger scale. A main body 35, which carries the nipple 20 on its upper end, is screwed onto the distributing member 13 with a sealing O-ring 36 interposed therebetween. A somewhat cup-shaped valve element 38 is axially displaceably arranged in a cylindrical bore 37 in the main body 35. Referring to FIG. 4, a smaller bore 39 extends upwardly from the bore 37 and forms the inner bore of the nipple 20, while a bore 41 of larger diameter extends downwardly from the bore 37 and is joined thereto by a sloping shoulder 40. The step between the bores 37 and 39 forms an end stop for the valve element 38.

The cylindrical valve element 38 has in the region of its lower end an inserted sealing ring 42 which, by abutting against the main body 35 or against the sloping shoulder 40 thereof, can seal off the bore 41. The downwardly closed valve element 38 has lateral openings 43 which communciate between the exterior of the valve element and its inner bore 44. The bore 44 communicates with the bore 39 in the main body and is in alignment therewith. A sealing O-ring 45 is inserted into a groove in the exterior of the valve element 38 above the openings 43 and seals the valve element relative to the bore 37 in the main body 35. Similarly, a sealing O-ring 46 is provided for the same purpose at the upper end of the valve element 38.

A sleeve-like actuating element 31 is axially displaceably arranged around the main body 35. In a manner to be explained later, the actuating element extends somewhat into the region occupied by the nipple 20 and is normally urged upwardly, i.e., towards the nipple, by a spring 47 which abuts against the main body. In order to obtain satisfactory rigidity and to prevent turning, the actuating element is provided with axially extending ribs and recesses which partially cooperate with complementary ribs on the main body.

In order to transmit axial displacement of the actuating element 31 to the valve element 38, these two parts are inter-connected by transmission members 48 in the form of pressed-in plastics pins. The transmission members 48 extend through slots 49 in the main body 35. The axial lengths of the slots 49 are such as to permit movement of the valve element 38 between an open and a closed position. The portion of the bore 37 containing the slots 49 is sealed by the two O-rings 45 and 46 so that no water can pass outwardly through the slots 49.

In FIG. 5, the inner portion 19 is illustrated with the valve in its open position and with the connector pushed on. The connector cooperates with the nipple 20 which has essentially three diameter steps. The step 55 of smallest diameter, located at the free end of the nipple, has a groove into which a sealing O-ring 57 is inserted. A chamfered portion is contiguous to the first step 55 and its highest point forms the second, somewhat larger diameter step 59. A chamfered support portion 51 is formed between the diameter step 59 and a continuous recess 50 contiguous thereto. The third, largest diameter step 52 is contiguous to the recess 50 by way of a chamfered portion or rounding and its highest part is cylindrical.

A quick-fastening plug-in connector 16 is pushed onto the connector nipple 20. The connector has an outer body 56 provided with an inner opening which communicates with the bore 39 in the nipple and which is adapted to the steps 55, 59, 52 in its region outwardly overlapping the nipple.

Inserts 60 are inserted into openings 58 located in the outer body 56. The inserts are made from plastics material and are prismatic and have a dog portion 61 and a spring portion 62 which are resiliently movable towards one another.

The inserts (preferably, three are provided around the periphery) abut against a sleeve 63 which is rotatably guided on the outer body 56. A torsion spring 64 urges the sleeve into the angular position illustrated in the drawings. Around the periphery of the sleeve are distributed recesses 65 into which the support point or fulcrum 66 of the insert 60 can penetrate when the sleeve is manually rotated against the torsional force of the spring 64 into a position in which the recesses 65 are located over the support points 66 of the inserts.

A hose 15 is attached to the connector 16 in a pressure-tight manner. For this purpose, the outer body 56 has an inner sleeve 67 and an outer sleeve 68. The hose 15 is slipped onto the inner sleeve 67, while a clamping nut or clamping ring 69 is screwed onto a screw thread on the outer sleeve 68. A sloping surface on an end flange of the clamping ring 69 urges gripping elements 70 inwardly against the hose, each gripping element having a relatively solid portion which is provided with teeth and which is connected to the outer sleeve 68 by means of a flexible neck. The gripping elements 70 are separated from one another by radial slots, so that they are individually movable owing to the resilient necks.

In order to connect a hose 15 to the pipeline system, the connector 16 secured to the hose is pushed axially onto the nipple 20. The inserts 60 have leading chamfers so that the inserts 60 are urged outwardly against the force of their spring portion 62 by the nipple, i.e., first by the step 55 and then by the step 59, until they engage in the continuous recess 51. Corresponding oblique surfaces on the inserts 60 are thus applied against the support chamfer 51, so that force is transmitted by the oblique surface transversely through the insert and to the sleeve 63 by way of the support point 66. The O-ring 57 ensures the fluid-tightness of the connector.

When the connector is pushed on, its outer portion 56 presses against the upper end face of the actuating element 31 and urges the latter downwardly against the closing force of the spring 47 (FIG. 5). The valve element 38 is moved downwardly by the transmission members 48, so that the valve is now open. Thus, liquid can flow from the distributing member 13 into the hose 15 by way of the bore 41, the openings 43 in the valve element 38, the bore 44 in the valve element and the bore 39 in the nipple 20. As already mentioned, the sealing rings 45 and 46 prevent fluid from escaping through the slots 49.

The hose is removed by turning the sleeve 63 manually until the openings 65 are located over the support points 66. The inserts can then yield outwardly, so that they ride over the step 59 under the tractive force effected between the connector and the nipple. Thus, the connector is released by removing the support points for the inserts. It is to be noted that the sleeve 63 could be constructed so as to be longitudinally displaceable.

When detaching the connector, the actuating element 31 is urged upwardly again under the force of the spring 47 and takes with it the valve element 38, so that the valve opening formed between the main body 35 and the sealing ring 42 is again closed. Owing to the relatively long distance which the O-ring 57 in the interior of the coupling can travel until it encounters a depression, the valve element 38 reaches its closed position before the seal at the connector is broken. Thus, virtually no water can emerge from the nipple.

It will be seen that the described coupling element in cooperation with the plug-in connector offers a simple possibility of coupling fluid conduits. The connection and the opening of the valve are effected by a single manipulation so that one can speak of the invention as providing a "water socket."

FIG. 6 shows a pipe connection such as is used between the plastics pipes 11 and connection members 12 or distributing members 13. Thus, the illustrated pipe connection serves to interconnect two lengths of pipe and to provide a distribution of pipes, as shown in FIG. 1, and also to couple the coupling members 14.

The plastics pipe 11 has a continuous peripheral recess 72 located at a short distance from its end. The side of the recess 72 adjacent the end of the pipe is defined by a steep shoulder 73, and the recess 72 has a chamfered portion 74 extending towards the opposite end of the pipe. The portion 75 located therebetween is substantially cylindrical but preferably has a very slight taper which widens (in the order of magnitude of 2°) towards the chamfered portion.

A support sleeve 76 is inserted into the pipe in the region of the end thereof. The support sleeve abuts the end of the pipe by a flange 77 and extends into the pipe 11 at least past the region of the recess 72. The support sleeve is also made from plastics material, preferably from a polyamide. A ring 78 is slipped onto the pipe 11 and has a conical peripheral surface 79 which tapers towards the end of the pipe and a flange 80 remote from the end of the pipe. The ring is made from resilient material, and is dilated when it is slipped onto the pipe 11 so that it snaps into the recess 72, thus conforming substantially to the configuration of the recess 72. Its end face facing the end of the pipe abuts against the steep shoulder 73.

The pipe thus equipped is inserted into the connection member 12 whose body is substantially tubular and has end portions 81 which carry an external screw-thread 82 and whose bores widen conically outwardly. The conical bore portion 83 of the connection member is somewhat steeper than the conical peripheral surface 79 of the ring 78 after the ring has been snapped into the recess 72.

When the ring 78 has been snapped onto the pipe 11, the pipe 11 is inserted into the connection member 12 and clamped by means of a clamping nut 84 which acts upon the flange 80 and which cooperates with the external screw-thread 82. The conical bore portion 83 of the connection member 12 thus slides along the ring 78 and presses the latter firmly into the recess 72. The end portion 81 of the connection member 12 should overlap the ring 78 over the whole of the recess 72.

The ring 78 is deformed to a greater or lesser extent according to the material from which it is made. Good results have been attained with rings whose material lay substantially between the following values: soft PVC (polyvinyl chloride) of 90 Shore A hardness and medium hard polyethylene, 40 to 50 Shore D hardness. The material should have a good recovery factor in order to obviate impairment of the sealing effect during repeated use.

It has transpired that considerable forces can be exerted upon the pipe connection by thermal expansion and contraction when greater lengths of piping are installed. Conventional connection members tend to shear or be destroyed in some other manner. The shearing cross section is extremely large in the pipe connection constructed in accordance with the invention, and the rigid clamping of the ring prevents the latter from yielding. Nevertheless, the recess 72 is so shallow that it only slightly weakens the wall of the pipe (for example, it is sufficient for the recess to have a maximum depth of 0.7 mm. when the tube has an external diameter of about 20 mm. and a wall thickness of about 2 mm., the length of the recess being about 10 mm. and its distance from the end of the pipe being about 8 mm.). Despite this very shallow recess, which may readily be provided, the pipe connection can withstand extremely great forces. It has been ascertained that the pipe connection can withstand virtually all forces exerted by thermal expansion and can remain permanently fluid-tight despite these great stresses. Thus, the ring, which is simple to slip on and snap in, forms an element for transmitting to slip on and snap in, forms an element for trans the greatest forces in addition to forming a sealing element. Furthermore, it has been ascertained that the hardness of the ring 78 has substantially no effect upon the sealing. However, the conditions of the transmission of the force can be influenced by different hardnesses of the material from which the ring 78 is made. In the case of a harder ring, the maximum shearing force is greater, while, in the case of a softer ring, the pipe connection is rendered somewhat more resilient, so that pressure forces can be reduced to a certain extent due to the elasticity of the ring 78. In detail, the pipe connection functions in the following manner:

When the pipe connection is slipped onto the pipe, the inner, steeper portion of the conical bore portion 83 (which is preferably a 10° chamfering) comes into abutment against the end face of the ring 78 facing the right in FIG. 6. When the clamping nut 84 is tightened, the connection member, particularly the steeper portion thereof, presses the ring 78 firmly and sealingly into the recess. Relatively long distances are covered in the axial direction, since the outer, flatter portion of the conical bore portion 83 has only a slight degree of taper (e.g., 2°). The material of the ring can be so greatly displaced or deformed that it almost completely fills the space between the clamping nut, the pipe and the connection member and thus forms a satisfactory and absolutely tight connection.

Although the connection member 12 is primarily intended to interconnect standard lengths of pipe 11, it is also suitable to seal the end of a pipe. For this purpose, a closure member in the form of a blanking disc 28 is screwed onto the second end portion 81 by means of a clamping nut 84. The blanking disc has a continuous axial projection 85 and an outer peripheral flange 86. The flange 86 is pressed in the axial direction towards the connection member 12 by the corresponding, inwardly directed flange 87 of the clamping nut, so that a sealing O-ring 88 is clamped sealingly between the end face 89 of the blanking disc and the flange 86. The clamping nut prevents the sealing ring from yielding outwardly and the projection 85 prevents it from yielding inwardly. In this manner, the connection member is reliably and tightly sealed by only a few manipulations.

It may be mentioned that the above-described clamping disc may also be used in cooperation with the other parts of the pipeline system. Thus, a 90° bend or elbow is provided by using a distributing member 13 and a blanking disc, so that a special L-piece is not required.

It will be seen that the pipeline system may be readily and securely assembled without using any tools, so that it may readily be installed by unskilled labour. Faulty installation and consequent leaks are virtually excluded by using standard lengths of piping in which the recess 72 has already been provided and onto which the ring 78 has already been pressed. The great flexibility of the system, which is made substantially entirely from plastics material, ensures simple and reliable installation and a high degree of safety with respect to thermal or other stresses. Thus, it is possible to lay the pipeline at a relatively short distance below the ground, so that only a small amount of excavation is necessary for installing the pipeline.

We claim:

1. In a pipeline system connectible to a mains liquid supply: a plurality of lengths of plastics piping, each end of each of said lengths having an external peripheral recess therein adjacent its extremity; a plurality of coupling elements each having a connector nipple adapted to receive a quick fastening plug-in connector; and means for connecting said pipe lengths to one another and to said coupling elements, said connecting means comprising hollow connecting bodies having at least one end portion adapted to receive one end of one of said pipe lengths, connection elements disposed in said peripheral recesses of said pipe length ends and clamping nuts screwable on said connecting body end portions, said clamping nuts having abutment surfaces to engage and act upon said connection elements and effect a substantially rigid connection and fluid tight seal between said pipe end and said connecting body end portion, each of said coupling elements having one of said coupling means associated therewith with said nipple of said coupling element extending substantially perpendicularly to said end portion of the connecting body of said connecting means and at a short distance from said end portion, each of said coupling elements further having shut-off valve means therein for controlling fluid flow from the interior of the respective connecting body to said nipple and means operable responsively to the attachment of a plug-in connector to said nipple to open said shut-off valve means and hold said valve means in an open position so long as said plug-in connector remains attached to said coupling element.

2. A pipeline system according to claim 1, and so constructed that it can be laid in the ground.

3. A pipeline system according to claim 1, further comprising a housing surrounding each of said connecting elements, said housing having substantially closed sides and bottom to define a well, said housing being constructed to be buried in the ground with the nipple upstanding substantially vertically in said well and with the region of the top of said well substantially flush with the ground.

4. A pipeline system according to claim 3 in which said housing has a hinged cover thereon for closing the top of said well.

5. A pipeline system according to claim 3 in which said housing includes an anchor plate which may be buried in the ground with the top of said well somewhat above the surface of the ground.

7. A pipeline system according to claim 3 in which said housing includes a base plate having openings therein for the purpose of mounting the housing.

6. A pipeline system according to claim 5 in which said housing has double-walls of which an inner wall defines said sides of said well, said anchor plate comprising a lateral extension of the outer wall of said double walls, said outer wall having recesses to accommodate the ends of said pipe lengths.

8. A pipeline system according to claim 3 in which the connecting body appertaining to each connecting element is disposed below the bottom of said well and in which the connecting element has a main valve body for said shut-off valve, said main valve body being in screw-threaded connection with said connecting body and said nipple being disposed on said main valve body.

9. A pipeline system according to claim 3 in which said shut-off valve has a main valve body, a valve closure element displaceable in said main valve body from a closed position in which fluid flow to said nipple is shut off, an actuating element engageable by an outer portion of the plug-in connector when the latter is pushed onto the nipple to open said closure element and hold the latter open, and means biasing said valve closure element to said closed position.

10. A pipeline system according to claim 9 in which a filling piece is arranged in the region of the bottom of said well and partially embraces said coupling element.

11. A pipeline system according to claim 10 in which said filling piece comprises soft resilient foam material.

12. A pipeline system according to claim 10 in which said filling piece covers the lower end of said actuating element.

13. A pipeline system according to claim 10 in which said filling piece is removable.

14. A pipeline system according to claim 1 in which said shut-off valve has a main valve body, a valve closure element displaceable in said main valve body from a closed position in which fluid flow to said nipple is shut off, an actuating element engageable by an outer portion of the plug-in connector when the latter is pushed onto the nipple to open said closure element and hold the latter open, and means biasing said valve closure element to said closed position.

15. A pipeline system as claimed in claim 14 in which said actuating element comprises an axially displaceable sleeve disposed about said main valve body and in which said biasing means comprises a spring.

16. A pipeline system according to claim 14, in which said main valve body has a valve seat therein and a bore leading from said valve seat towards said nipple and in which said valve closure element comprises a generally cup-shaped element axially displaceable in said bore in the main valve body and cooperates with said valve seat, said cup-shaped element having a hollow portion communicating with said nipple and having side openings communicating with said hollow portion for the flow of liquid thereinto from said valve seat when said shut-off valve is open.

17. A pipeline system according to claim 14 in which said main valve body has openings therein and in which said shut-off valve includes transmission members which extend through said openings in the main valve body and connect said actuating element to said valve closure element.

18. A pipeline system according to claim 17, in which said transmission members comprise press-fitted plastics pins.

19. A pipeline system according to claim 17 in which said shut-off valve includes sealing rings arranged at axially opposite sides of said openings in said main valve body between said valve closure element and said main valve body.

20. A pipeline system according to claim 1 in which each of said continuous peripheral recesses has a flat chamfered portion directed away from the pipe end and a steep shoulder adjoining the pipe end and in which said connection element in said recess comprises a resilient ring, said clamping nut axially clamping said ring between said ring and said connecting body end portion.

21. A pipeline system according to claim 20 in which said resilient ring has inner and outer conical surfaces which taper inwardly towards the end of the pipe length, said inner surface of said ring being substantially adapted to said peripheral recess with one end of the ring abutting against said steep shoulder, and in which said connecting body end portion has an internal conical surface adapted to overlie said outer surface of said resilient ring over substantially the entire region of said peripheral recess to press said resilient ring into said recess by the inwardly directed radial force exerted upon the ring by the wedging action.

22. A pipeline system according to claim 21 in which said resilient ring has at one end a flange, said clamping nut axially abutting said flange.

23. A pipeline system according to claim 21 in which said peripheral recess has a substantially cylindrical portion between said flat chamfered portion and said steep shoulder.

24. A pipeline system according to claim 20 in which said peripheral recess has an axial width which is very large relative to its depth.

25. A pipeline system according to claim 20, which further comprises a support sleeve inserted into said pipe length and extends axially from said end of said pipe length at least through the region of said peripheral recess.

26. A pipeline system according to claim 20 in which said pipe lengths, said connecting bodies and said clamping nuts comprise plastics material.

27. A pipeline system according to claim 20 in which at least one connection member has an end surface, a sealing ring, a blanking-off member and a clamping nut for compressing said sealing ring between said blanking-off member and said end surface, said blanking-off member having a continuous axial projection for securing said sealing ring against inward displacement.

References Cited

UNITED STATES PATENTS 2,215,932  9/1940  Mowery _____ 137—236

HENRY T. KLINKSIEK, Primary Examiner

U.S. Cl. X.R.

239—207, 551, 271; 251—149.8; 137—236